US007905370B2

(12) United States Patent
Leonetti

(10) Patent No.: US 7,905,370 B2
(45) Date of Patent: Mar. 15, 2011

(54) DISPENSER OF CONSUMABLE PRODUCTS SUCH AS DRINKS

(76) Inventor: Philippe Leonetti, Rambervillers (FR)

( * ) Notice: Subject to any disclaimer, the term of this patent is extended or adjusted under 35 U.S.C. 154(b) by 0 days.

(21) Appl. No.: 12/093,016

(22) PCT Filed: Nov. 7, 2006

(86) PCT No.: PCT/FR2006/002469

§ 371 (c)(1),
(2), (4) Date: May 8, 2008

(87) PCT Pub. No.: WO2007/054636

PCT Pub. Date: May 18, 2007

(65) Prior Publication Data

US 2008/0277407 A1 Nov. 13, 2008

(30) Foreign Application Priority Data

Nov. 8, 2005 (FR) ..................................... 05 11320

(51) Int. Cl.

| | |
|---|---|
| ***B65G 59/00*** | (2006.01) |
| ***B65G 1/04*** | (2006.01) |
| ***B65G 69/00*** | (2006.01) |
| ***B65H 3/00*** | (2006.01) |
| ***G07F 11/00*** | (2006.01) |

(52) U.S. Cl. .......... 221/22; 221/242; 221/131; 221/281; 221/282; 221/1; 312/74; 312/42; 312/36; 312/47; 62/378; 62/63

(58) Field of Classification Search .............. 221/1, 242, 221/131, 281, 22, 150 R, 282, 15 A; 312/41, 312/71, 42, 36, 47; 62/378, 63
See application file for complete search history.

(56) References Cited

U.S. PATENT DOCUMENTS

| | | | | |
|---|---|---|---|---|
| 1,736,057 | A | | 11/1929 | Smith |
| 2,360,573 | A | * | 10/1944 | Mena ............................ 221/311 |
| 2,397,403 | A | * | 3/1946 | Bishop ...................... 221/150 R |
| 2,499,089 | A | * | 2/1950 | Brill et al. ....................... 62/251 |
| 2,506,717 | A | * | 5/1950 | Fulmer ......................... 221/242 |
| 3,710,978 | A | * | 1/1973 | Cosby ....................... 221/150 A |

(Continued)

FOREIGN PATENT DOCUMENTS

| | | | | |
|---|---|---|---|---|
| GB | 874 955 | | | 8/1961 |
| GB | 1 311 751 | | | 3/1973 |
| GB | 2 301 172 | | | 11/1996 |
| GB | 2301172 | A | * | 11/1996 |
| WO | 2004/113808 | | | 12/2004 |

*Primary Examiner* — Gene O. Crawford
*Assistant Examiner* — Rakesh Kumar
(74) *Attorney, Agent, or Firm* — Davis & Bujold, P.L.L.C.

(57) ABSTRACT

A simple, inexpensive, reliable and maintenance-free dispenser in which the stored products are offered automatically on the outside of the dispenser where they can be grasped by a hand without further manipulation. The dispenser includes housings in which the products, stacked in a column, are stored and moved by gravity and, at the base of each housing in front of the first product of the column, outlet orifices are closed by a closing membrane with slits. A slope is provided, in the lower rear part of each housing, to automatically advance the first product a predetermined distance through the outlet orifice so that the product partially emerges and can be grasped by hand on the outside of the dispenser. The dispenser can be used to automatically dispense consumable products, such as drinks, without prepayment, and for all types of industrial, commercial, home and other applications.

16 Claims, 8 Drawing Sheets

U.S. PATENT DOCUMENTS 4,798,319 A * 1/1989 James, Jr. .......... 224/251
4,817,818 A * 4/1989 Lockhart .......... 221/1
4,920,763 A * 5/1990 Provest et al. .......... 62/378
4,941,327 A * 7/1990 Miles .......... 62/246
5,277,332 A * 1/1994 Rogers .......... 221/96
5,706,977 A * 1/1998 Ogura et al. .......... 221/197
5,799,824 A * 9/1998 Gasiel .......... 221/298
6,269,285 B1 * 7/2001 Mignault .......... 700/236
7,150,155 B2 * 12/2006 Faber .......... 62/63
2005/0061007 A1 * 3/2005 Faber .......... 62/63

* cited by examiner

DISPENSER OF CONSUMABLE PRODUCTS SUCH AS DRINKS

This application is a national stage of PCT/FR2006/002469 filed Nov. 7, 2006 which claims priority from French Application Serial No. 0511320 filed Nov. 8, 2005.

TECHNICAL REALM

The present invention concerns a dispenser of consumable products, especially beverages packaged in containers such as bottles, cans, or cups, comprising a thermally insulated case having at least one housing to receive products that are superimposed in at least one stack and at least one outlet opening located at one end of the housing opposite the first product in the stack so as to allow the product to be retrieved manually, with the other products advancing automatically to successively present themselves opposite the outlet opening while the first product in the stack is being removed.

PRIOR ART

U.S. Pat. No. 1,736,057 describes a dispenser of this type in which the outlet opening is located at the lower extremity of the housing and the products descend automatically by gravity. Consequently, this dispenser is very simple in design and offers the advantage of operating without any moving parts. In this example, the dispenser is refrigerated and comprises several housings arranged side by side, each outlet opening being closed by a sealed pivoting door attached with a spring hinge, obliging the user to open the door with one hand and keep it open to search for a drink while introducing the other hand into the housing through the outlet opening. Thus, access to the drinks is neither simple, quick, nor immediate. The same disadvantages recur with the dispensers described in publications US 2005/0061007 and WO 2004/113808.

In the dispenser in U.S. Pat. No. 3,710,978, the beverages, contained in cylindrical cans, are stored in a stack and descend by gravity to an outlet opening where they can be removed using only one hand. The cans are perpendicular relative to the axis of the outlet opening and they are propelled toward this outlet opening by a ramp located in the rear. In this configuration, the cans roll around and risk being automatically ejected from the dispenser. This is the reason that the outlet opening comprises a retaining stop to block the lower can and hold back the stack. In order to allow extraction of a can, this outlet opening comprises lateral cutouts allowing it to be gripped by the ends and an upper cutout allowing it to be raised to free the retaining stop. This manual manipulation is not instantaneous and it is impossible for small hands. Moreover, the geometry of the outlet opening does not permit it to be sufficiently airtight for a refrigerated application.

There also exists refrigerated cabinets closed by a sealed door which the consumer must open to access the products stored within, causing a considerable waste of energy each time the door is opened since the cold air is uselessly diffused outside the cabinet.

There are also open refrigerated cabinets offering the consumer the advantage of easy access to the products, but with major drawbacks such as wasting too much energy, operating loudly, chilling the environment where they are located, and breaking down frequently.

DESCRIPTION OF THE INVENTION

The present invention proposes a solution for improving accessibility to the products stored in the dispenser, offering an ultra-simple design with no moving parts and thus no risk of mechanical breakdown, and considerably reducing energy loss in refrigerated dispensers. In that instance, the invention offers an effective compromise that is more economical and environmentally friendly than existing refrigerated cabinets.

To achieve this, the invention concerns a dispenser of the type indicated. The outlet opening is closed by a blocking membrane with slits made of airtight material, and in that the dispenser comprises at the end of the housing a ramp angled towards the outlet opening located at the rear of the housing and causing the product in the stack to advance along a predetermined course through the outlet opening so that it partially emerges through the blocking membrane and may be grasped manually from outside the dispenser without the need to open a door or a trap or to perform any other manipulation. Thus, the product is presented automatically to the consumer, even if the housing is a refrigerated one.

The outlet opening may be located at the lower extremity of the housing, with the stacked products being automatically displaced by gravity, or at the upper extremity of the housing, with the stacked products being automatically displaced by a pushing force, the housing defining a stack that may be either a straight vertical stack or a zigzag stack.

The housing is advantageously adjustable at least in depth in order to adapt to various product lengths. For this purpose, it comprises a fixed portion defining the base of the housing and an adjustable portion defining the lateral walls and rear of the housing and joined to the fixed portion by attaching means.

The attaching means may comprise complementary fittings or sliding parts respectively located on the fixed and adjustable portions of the housing and respectively defining fixed or infinite adjustment positions.

The dispenser preferably comprises several housings arranged generally parallel to one another to provide sufficient capacity, being at least partially formed of grills and separated from one another.

In the preferred embodiment, the case is closed by at least one door which allows the housing to be restocked with products.

It may also comprise either an integrated refrigeration means or a remote refrigeration means. In both cases, the housings are at least partially formed of grills.

It may also be modular in configuration. In this situation, the case is designed to receive at least one detachable module comprising at least the housing and the outlet opening, adapted for at least one product, and the dispenser comprises several interchangeable modules of this type.

The invention also concerns a dispensing cabinet comprising an assemblage of at least two dispensers like those defined above, the cabinet also possibly comprising a centralized refrigeration means and a means for connecting it to the dispensers.

The dispensers comprise an assembly means allowing them to be detached from one another, the assembly means advantageously being at least partially integrated within the exterior surfaces of the dispensers.

SUMMARY DESCRIPTION OF THE DRAWINGS

The advantages of the present invention will be more readily apparent from the following description of several embodiments provided by way of non-limiting examples, with reference to the attached drawings, in which.

BEST WAYS TO ACHIEVE THE INVENTION

With reference to the drawings, dispenser 10, 10' of consumable products according to the invention may, but does not necessarily, concern beverages packaged in disposable or returnable containers such as bottles 1 (cf. FIG. 1-6, 9, 10, 12), cans (cf. FIG. 13), or cups 5 (cf. FIG. 7-8) which may or may not be in the form of individual portions. It may also concern any consumable food product so long as the product is of sufficient consistency or is packaged in a sufficiently rigid container to be stored superimposed one on top of the other.

This dispenser 10, 10' is based on a simple, very economical and highly reliable dispensing concept, since it has no mechanisms or moving parts capable of causing malfunctions or requiring regular maintenance, as explained below.

Figure 1:
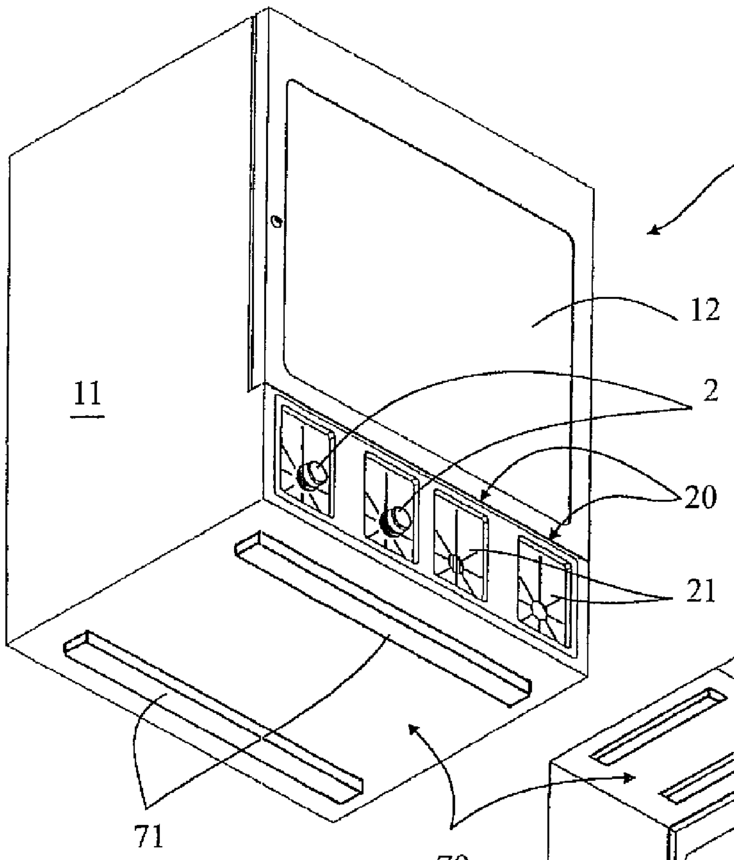
FIG. 1 is an elevation view of a first embodiment of a dispenser according to the invention.

It comprises, with reference to FIG. 1, a case 11 which may be cube shaped and equipped with a locking door 12 on the front allowing dispenser 10 to be restocked with bottles 1. The door may also be located on another surface of case 11. The front surface of case 11 is preferably transparent or translucent to display the bottles arranged inside dispenser 10. In the example shown, door 12 has a window and combines the functions of "window" and "access means" to a storage zone 30. Dispenser 10 also comprises on the front surface four outlet openings 20 located in the lower portion of case 11. The number of these outlet openings 20 depends upon the number of stacks of bottles 1 provided in storage zone 30. Each outlet opening 20 is closed by a flexible blocking membrane 21 with slots, arranged, for example, in a star shape, allowing a bottle 1 to emerge partially through it, with its mouth 2, for example, constituting a handle for extracting it manually without any need to open a door or trap or perform any other manipulation, thus maintaining the airtight seal of case 11, especially if it is refrigerated, and conserving cooling energy.

Figure 3:
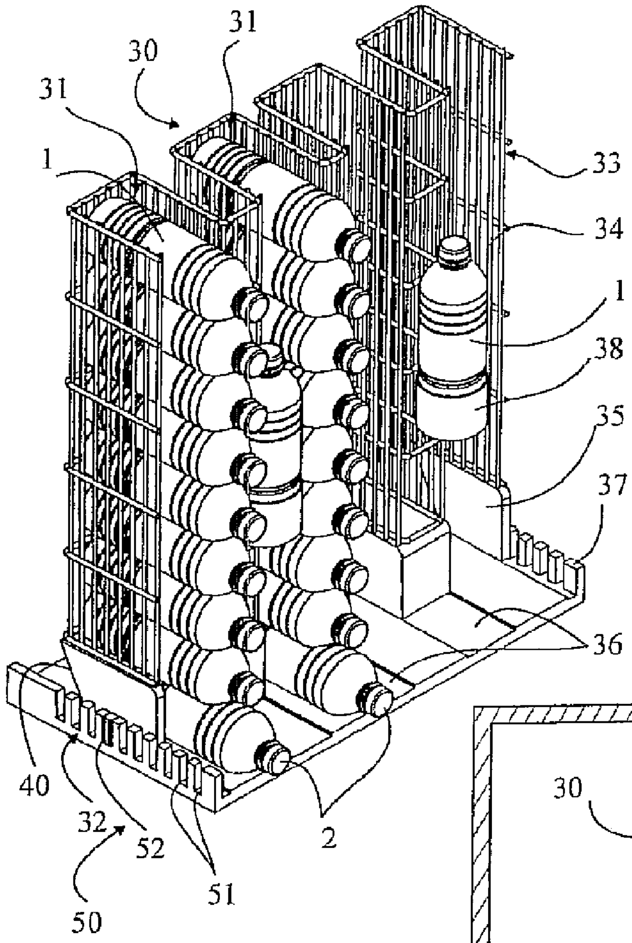
FIG. 3 is a perspective view of the storage zone of the dispenser of FIG. 1.
Figure 4:
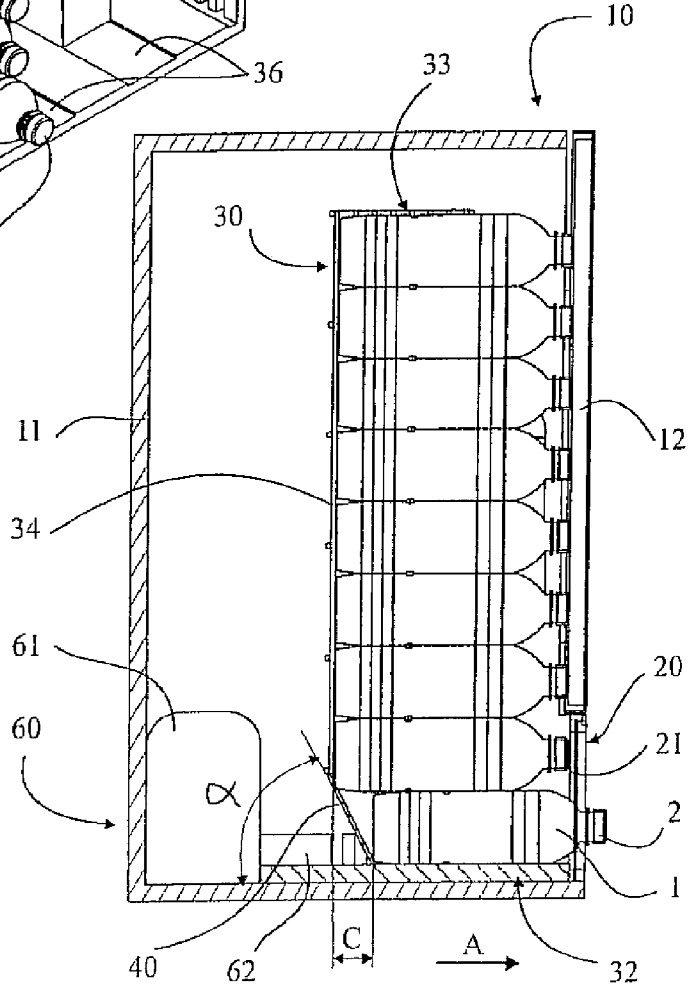
FIG. 4 is a lateral cross-section of the dispenser of FIG. 1.

Dispenser 10 comprises a storage zone 30 inside the case 11 a first example of which is illustrated by FIGS. 3 and 4, defining four parallel housings 31 for receiving horizontally positioned bottles 1 oriented parallel to the axis of outlet openings 20 with their mouths 2 facing forward, and stacked on top of one another in a column, each housing 31 opening into an outlet opening 20. This storage zone 30 may be made of solid, perforated, or grill partitions, or a combination of these types of partitions. In the example shown it is made of grills 34 attached to a base 35, the grills 34 forming baffles to separate housings 31 from one another and thereby improving product refrigeration, as will be explained below. The number of housings 31 varies depending upon the dimensions of case 11. The width and height of these housings 31 are defined according to the dimensions of bottles 1 or other products for dispensing. However, the width may be selected to accept products of different widths. Each housing 31 defines a straight vertical column capable of laterally guiding stacked bottles 1 so they descend automatically by gravity without becoming blocked and their extremity arrives in the axis of outlet openings 20. This vertical column may also have a zigzag shape. However, this version is more complex to manufacture and requires more lateral space than the version with straight columns.

Dispenser 10 comprises, at the base of housings 31, a means for automatically advancing the lower bottle 1 in each column towards its outlet opening 20 along a predetermined course C until the mouth 2 of bottle 1 appears outside outlet opening 20 so a hand can simply and quickly grasp it. This automatic advancement means comprises, at the rear of each housing 31, a ramp 40 angled towards the corresponding outlet opening 20. This ramp 40 forms with the base of housing 31 an angle $\alpha$ ranging from 45 to 900, preferably equal to 60°, and it displaces bottle 1, which continues its descent by gravity, horizontally into the axis of outlet opening 20 according to arrow A along a course C corresponding in this case to the height of the neck of bottle 1, approximately 2 to 3 cm. Ramps 40 are joined to housings 31 of adjustable depth so as to adapt storage zone 30 to different product lengths. They may be formed of solid, perforated, or grill walls. In the example shown in FIGS. 3 and 4, they are formed of solid walls provided in base 35 supporting grills 34.

To be adjustable in depth, storage zone 30 is formed of a fixed portion 32 located in the base of case 11 and defining the base of housings 31, and of an adjustable portion 33 defining the lateral and rear walls of housings 31 and joined to the fixed portion 32 by an indexing means 50. Fixed portion 32 consists of a generally rectangular plate with grooves 36 formed in it and having rims 37 on opposing sides, grooves 36 and rims 37 being perpendicular to the front surface of case 11. The adjustable portion 33 comprises base 35 and grills 34, base 35 being guided translationally within grooves 36 in fixed portion 32. Storage zone 30 may be completed by one or two supports 38 for holding a vertically positioned bottle 1 behind glass door 12 in order to display the product or products to be dispensed.

As shown in FIG. 4, bottles 1 are guided vertically on four sides by the lateral and rear walls of housings 31 and to door 12 against which the mouths 2 of the bottles abut, which prevents a bottle 1 from positioning itself crosswise.

The indexing means 50 may comprise complementary fittings respectively provided on the fixed portions 32 and adjustable portions 33 that define the fixed adjustment positions. The complementary fittings consist, as in the example illustrated, of two rows of notches 51 parallel to arrow A formed in opposing rims 37 on the fixed portion 32 and two fingers 52 sized to engage in a notch 51 located on the corresponding sides of base 35 of adjustable portion 33. Notches 51 are spaced at regular intervals, which could also be irregular, each notch 51 defining a fixed and predetermined adjustment position. Other equivalent forms of complementary fittings may be used. Even other indexing means may be used, such as for example, complementary sliding elements located respectively on fixed and adjustable portions 331 to allow an infinite number of adjusted positions.

Figure 5:
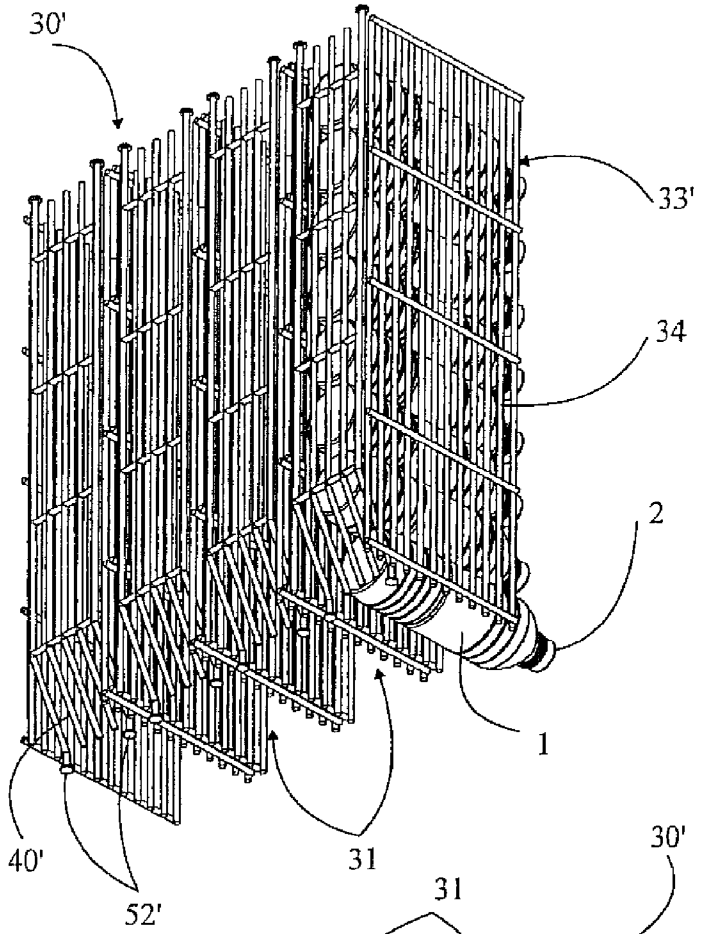
FIG. 5 is a view similar to FIG. 3 of a variation of the embodiment of the storage zone in the dispenser of FIG. 1.
Figure 6:
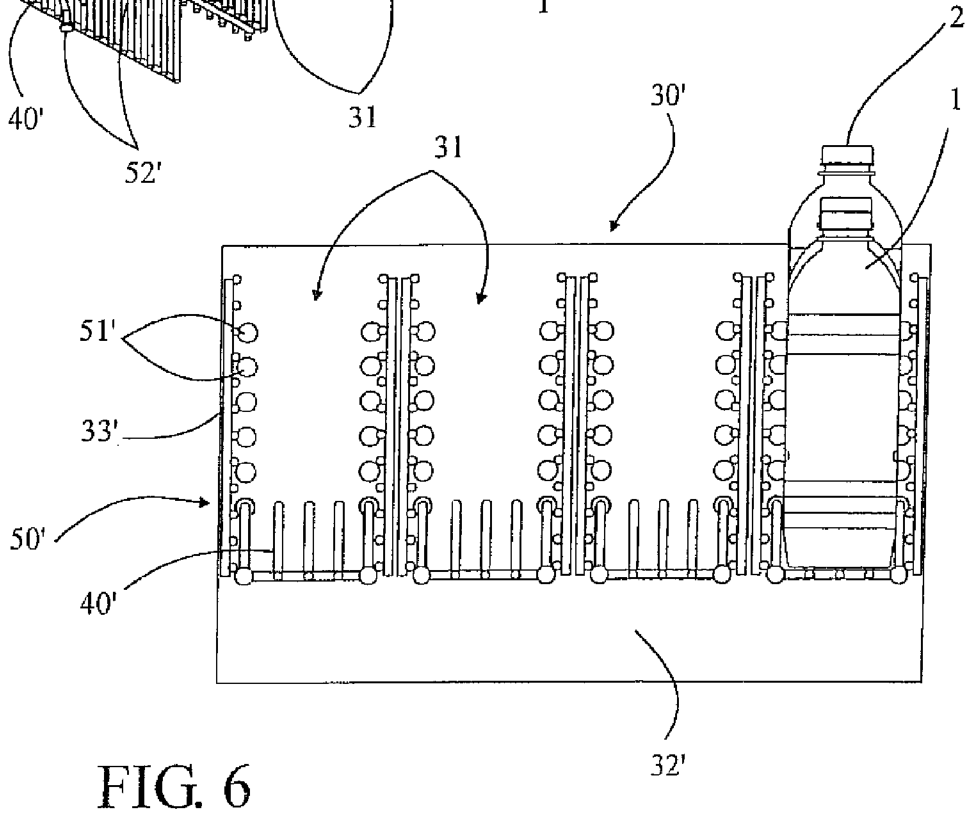
FIG. 6 is an overhead view of the storage zone of FIG. 5.

FIGS. 5 and 6 illustrate another embodiment of storage zone 30' made exclusively of grills 34, without a base, and in which ramps 40' are also formed of these grills 34. In this variation, the indexing means 50' comprises rows of parallel openings 51' located in the fixed portion 32' and feet 52' which engage in these openings 51' located at the base of adjustable portion 33', with openings 51' defining the fixed and predetermined adjustment positions.

Figure 7:
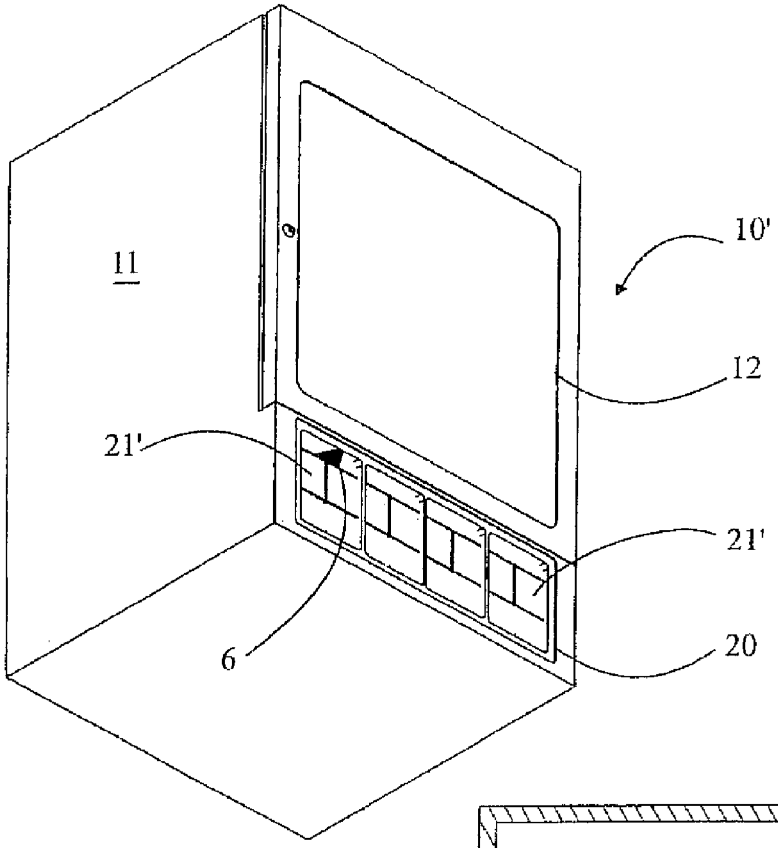
FIG. 7 is a view similar to FIG. 1 of a second embodiment of a dispenser according to the invention.
Figure 8:
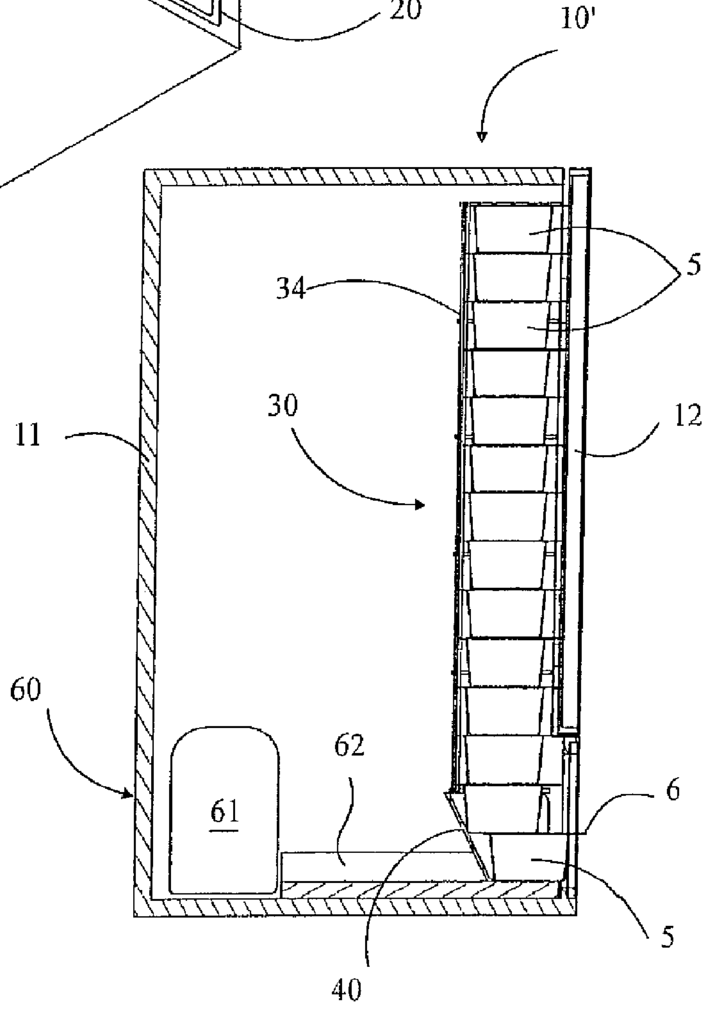
FIG. 8 is a view similar to FIG. 4 of the dispenser of FIG. 7.

FIGS. 7 and 8 illustrate another embodiment of a dispenser 10' according to the invention adapted for dispensing lidded cups 5. This dispenser 10' differs from the preceding one by having blocking membranes 21' at its outlet openings 20 with slots that are I-shaped, T-shaped, or similar, in order to allow the strip handle 6 of cups 5 to project partially. Of course, storage zone 30 is adapted to the size of cups 5.

Figure 9:
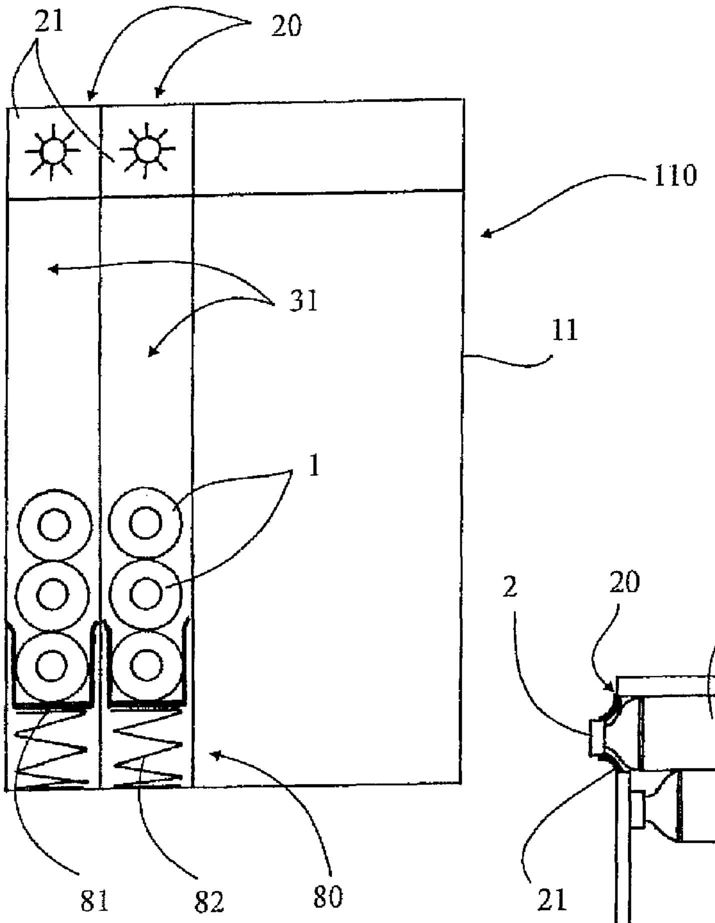
FIGS. 9 and 10 are, respectively, a front view partially in cross section and a lateral cross-section of a third embodiment of a dispenser according to the invention.
Figure 10:
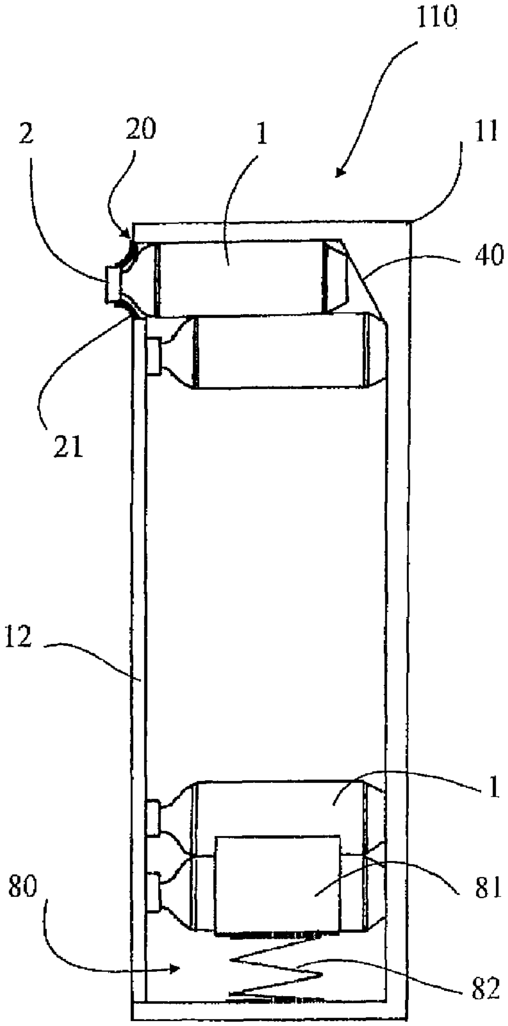
Figure 11:
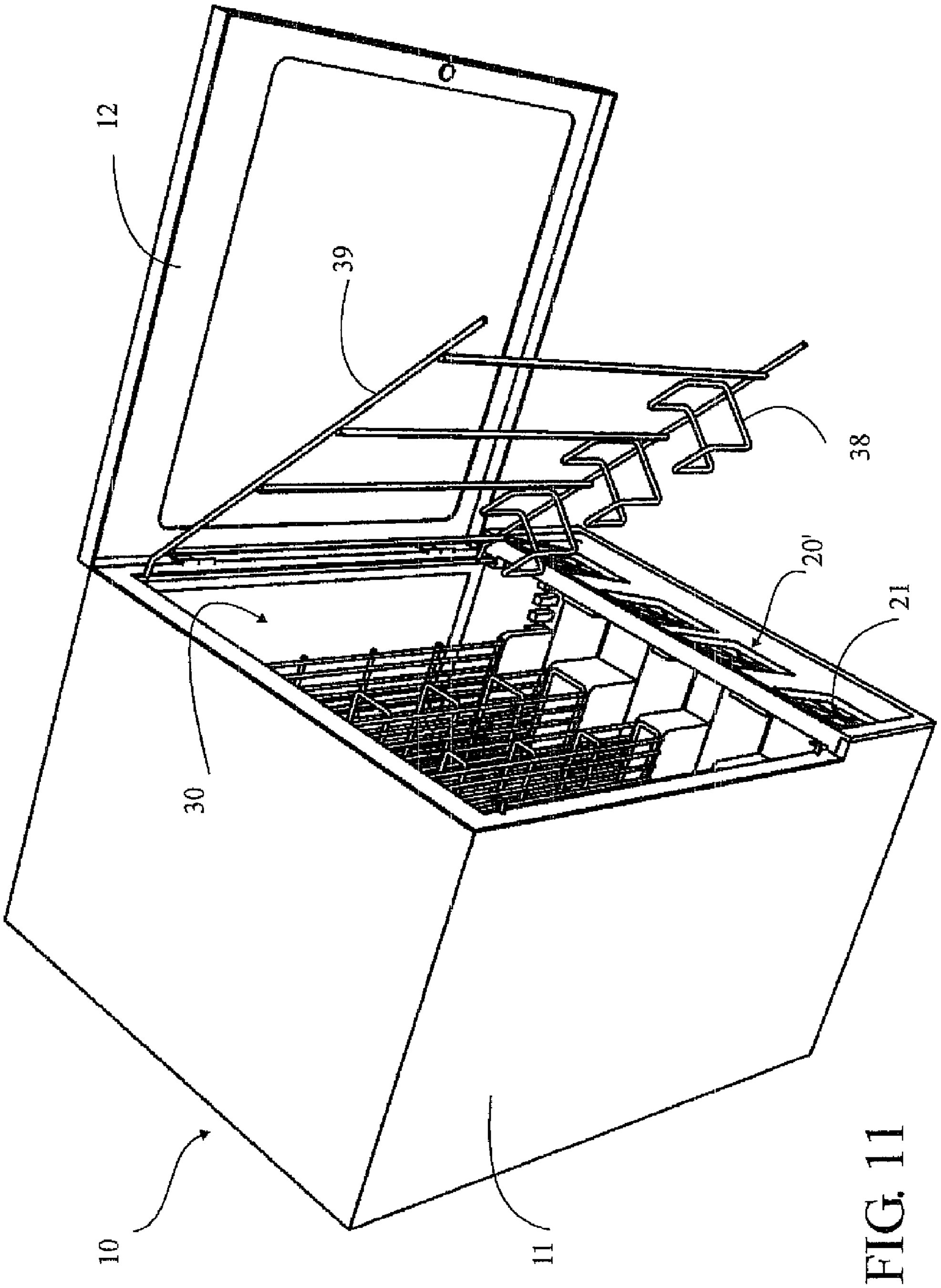
FIG. 11 is a perspective view of a fourth embodiment of a dispenser according to the invention, with the door open.

FIGS. 9 and 10 illustrate yet another embodiment of a dispenser 110 according to the invention in which outlet openings 20 are no longer located at the lower portion, but at the upper portion, and stacked bottles 1 are no longer displaced by gravity, but by a force exerted by a flexible means 80 located in the lower portion of each housing 31. This flexible means 80 comprises in the example shown a plate 81 attached to a spring device 82 such as a compressed helicoidal spring, a spiral spring, stacked Belleville washers, or a similar device. Thus, stacked bottles 1 are displaced automatically toward outlet opening 20 under the influence of spring device 82, with first upper bottle 1 being automatically displaced through outlet opening 20 by ramp 40. When this bottle is withdrawn from dispenser 110, the following bottle 1 appears automatically. If no new bottle 1 appears, this means that the housing 31 in question is empty and that it can be refilled by opening door 12. This type of dispenser 110 is advantageously used in bars to facilitate the work of the bartender and significantly reduce contortions when it is necessary to stoop and search for bottles stored in refrigerators with limited access behind the bar.

Dispenser 10, 10', 110 may comprise an integrated refrigeration means, either attached or remote. In this instance, case 11 is thermally insulated, door 12 is equipped with a sealing gasket, and blocking membranes 21, 21' are made of material that is airtight and watertight, for example, with a natural or synthetic rubber base, to ensure sealing of outlet openings 20 and limit loss of cold air. In the example shown, the refrigeration means 60 is integrated, housed inside case 11, and comprises a compressor 61, a static evaporator 62, and an exterior condenser in the rear (not shown), compressor 61 being connected to the electrical supply network with a cable (not shown). Grills 34 in storage zone 30, 30' are preferably made of corrosion-resistant metal wire to ensure satisfactory thermal exchange between refrigerated case 11 and bottles 1. The fact that the stacks of stored products are separated from one another by these grills 34 encourages air circulation and improves product refrigeration, thus consuming less cooling power. In the hypothetical instance where the refrigeration means is remote, dispenser 10, 10', 110 comprises connections to the cooling network (not shown). If the refrigeration means is attached, there is some means of attachment, such as clips or the like, for connecting the refrigeration unit to case 11.

Figure 2:
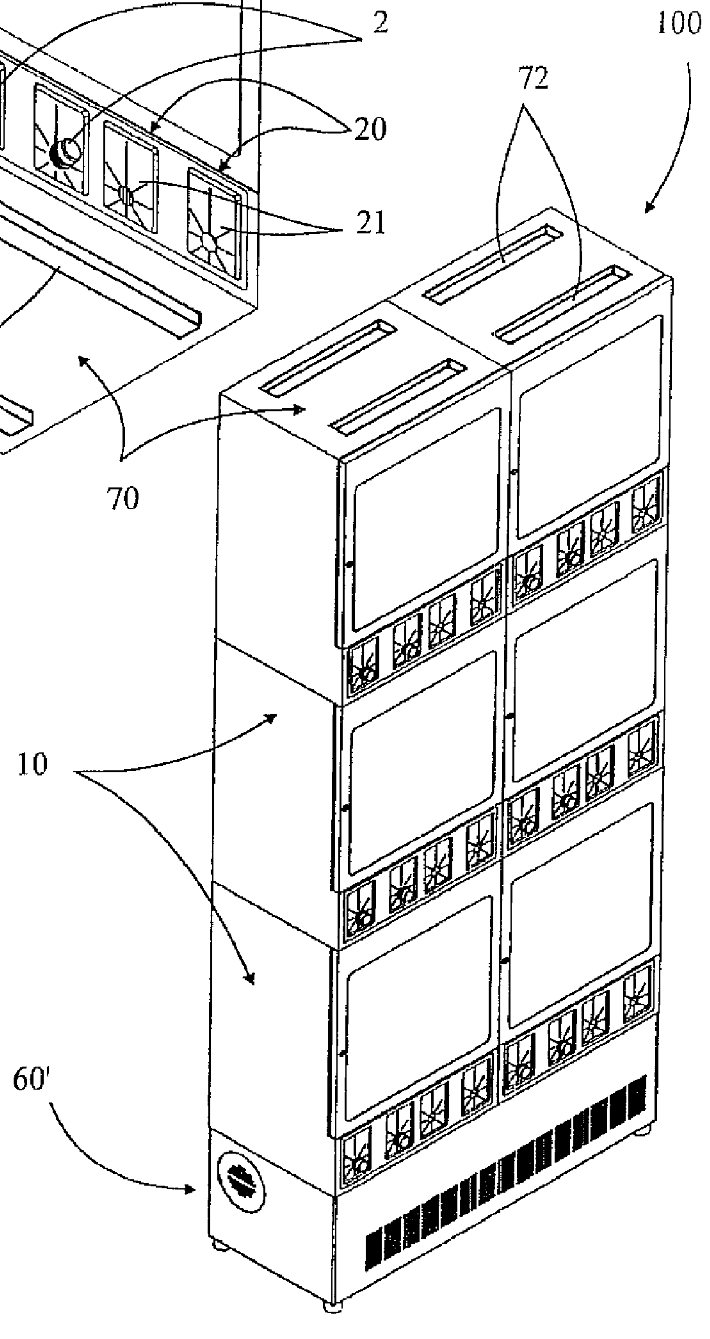
FIG. 2 is a perspective view of an arrangement of several dispenses according to FIG. 1.

The dispenser 10, 10', 110 may be completed by an assembly means 70 allowing several preferably identical dispensers to be combined to form a dispenser cabinet 100, like the example illustrated in FIG. 2, adapting the dispensing volume to demand. This assembly means 70 may be integrated with each dispenser 10, 10', 110 using complementary attachment means such as ribs 71 located on the lower surface of cases 11 and grooves 72 located on the upper surfaces. In this embodiment ribs 71 may serve as feet when dispenser 10, 10', 110 is used individually. Obviously any other form of complementary attachment may be used, the forms being located randomly on case 11, for the purpose of assembling dispensers 10 by superimposing them and/or placing them side by side like Legos®. The assembly means may also consist of additional parts, such as attaching brackets, hooks, and the like, to connect the cases to one another by screwing, clipping, or some similar method.

In dispensing cabinet 100, dispensers 10, 10', 110 may be completely independent and use their own refrigeration means 60, affording a great deal of flexibility in use; or conversely, they may be dependent and connected to a centralized refrigeration means 60' located in the lower portion of the cabinet, for example.

Figure 13:
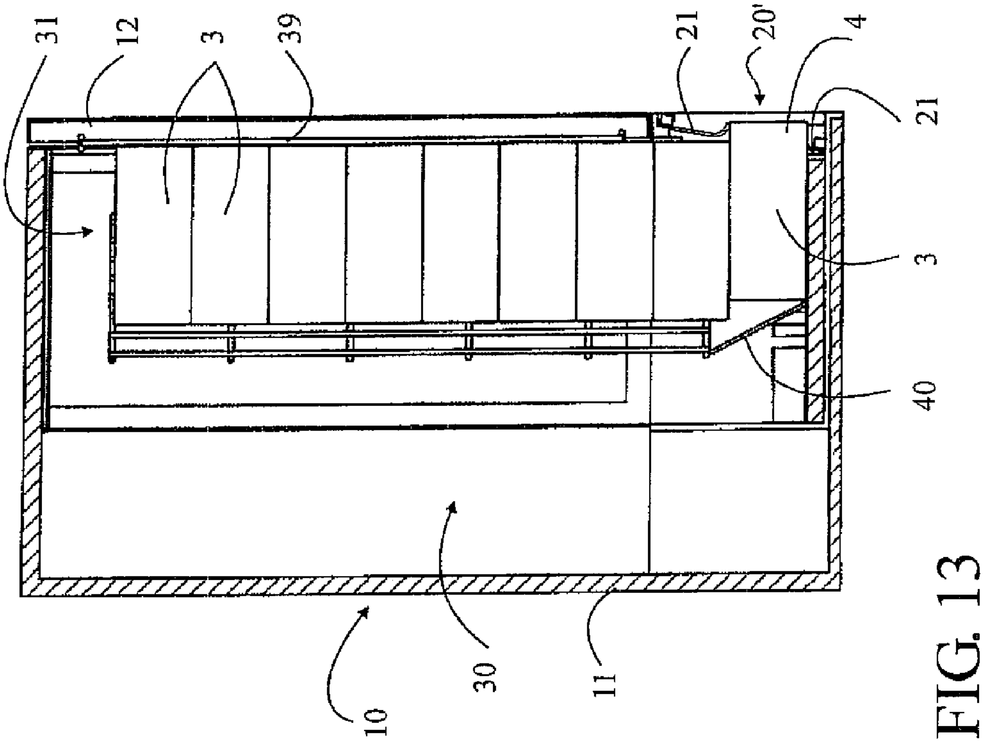
FIGS. 12 and 13 are side cross-sections of the dispenser of FIG. 11 shown with bottles and with cans, respectively.
Figure 12:
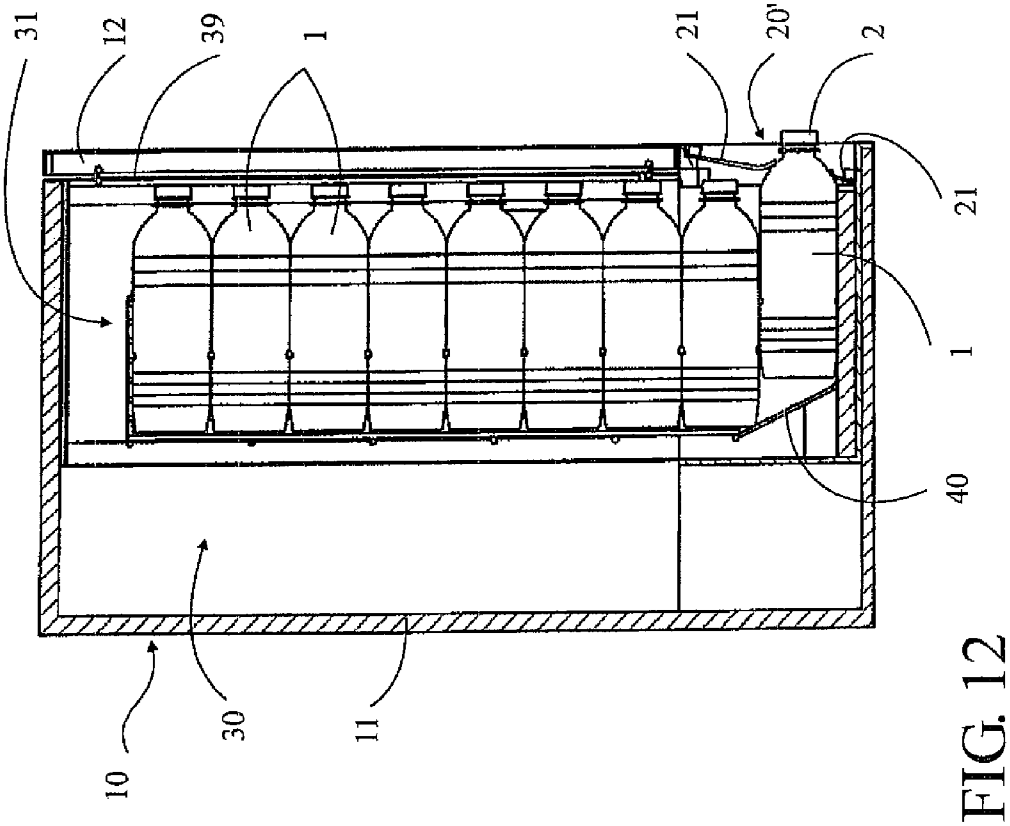

FIGS. 11 through 14 illustrate a variation of dispenser 10 of FIGS. 1 through 6 in which outlet openings 20' are angled relative to the front surface of case 11 in the direction opposite to the ramps 40 to facilitate the release and grasping of the product, as shown in FIGS. 12 and 13. In the preceding example in which the outlet openings 20 are essentially located in the plane of door 12, ramp 40 must be inclined sufficiently to generate a course C larger than the width of door 12. Therefore, a compromise needs to be reached between the angle of ramp 40 to ensure that the product is guided correctly without tipping or becoming blocked, and the course C to be generated to ensure that there is sufficient area for grasping the product outside the dispenser. The fact that outlet opening 20' is angled in the opposite direction from ramp 40 creates a larger product grasping area while the course C of the product remains the same. Moreover, since blocking membrane 21 is angled, it offers less resistance to the product, thus facilitating its discharge while still remaining airtight, as the membrane remains pressed against the periphery of the product. In FIG. 12, the stored products are bottles 1 and the gripping area comprises the mouth 2, the neck, and the first portion of the body of bottle 1. In FIG. 13, the stored products are cans 3 and the gripping area comprises the extremity 4 of can 3 and the first portion of the body of can 3.

Dispenser 10 of FIGS. 11 through 14 is completed by an intermediate grate 39 located between storage zone 30 and door 12. This intermediate grill 39 may be articulated with hinges to one side of case 11, as shown, or attached to the case by any other similar means. It holds supports 38 between its vertical shafts, which perform the function of vertically guiding the products through their housings 31 and maintaining them inside storage zone 30 when door 12 is open.

Figure 14:
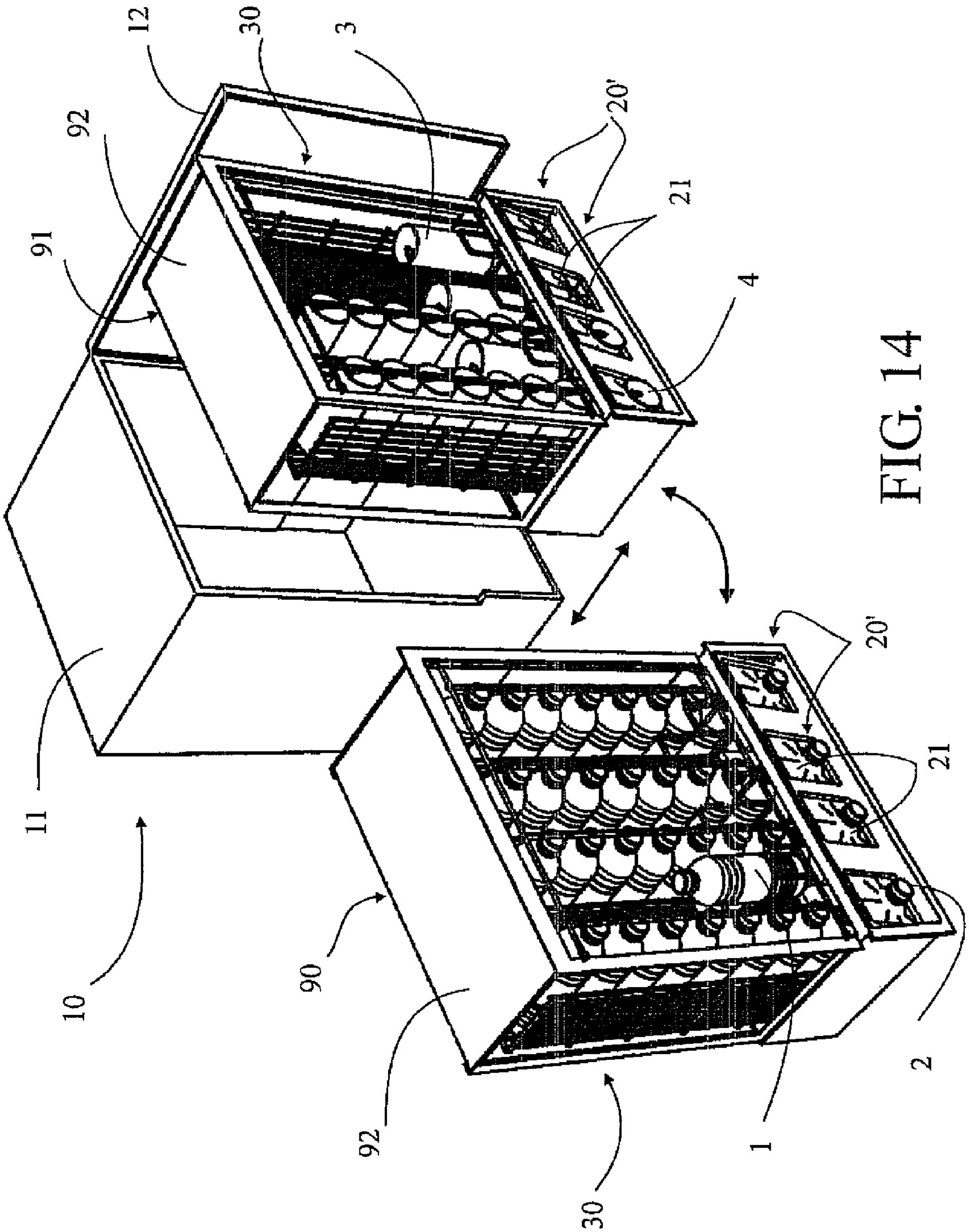
FIG. 14 is a perspective of a modular variation of the dispenser of FIG. 11.

This dispenser 10 may have a modular construction as shown in FIG. 14, in which case 11 that may comprise the refrigeration means is standard and may incorporate interior modules 90, 91 adapted to the products for storage, for example, one module 90 for dispensing bottles 1, one module 91 for dispensing cans 3, or any other module. In the example shown each interior module 90, 91 comprises a unit 92 surrounding storage zone 30, outlet openings 20' and intermediate grill 39, the dimensions of the unit allowing it to be introduced inside case 11 of dispenser 10 by sliding it like a drawer. Thus, a single dispenser 10 is quickly and easily adapted for different products by simply exchanging interior modules 90, 91.

POSSIBILITIES FOR INDUSTRIAL APPLICATION

This type of dispenser 10, 10', 110 may equip any industrial commercial, or even domestic location, since the products to be dispensed may be delivered conventionally by a transporter or purchased at a store with no need to modify the factory packaging. Once unpacked, the products are loaded into dispenser 10, 10', 110 through the front, with door 12 providing access to storage zone 30, 30'. Since housings 31 are open on the front, loading the products in a stack is very quick, as the first product in each stack automatically advances along course C using ramp 40, 40' relative to the rest of the stack. After door 12 is closed, dispenser 10, 10', 110 is very simple to use. The products are automatically presented in outlet openings 20, 20' and can be grasped easily by one hand. When a product is removed from dispenser 10, 10', 110, the next product appears, thanks to ramp 40 and the fact that the stack of products is automatically displaced. At any time dispenser 10, 10', 110 can be restocked if an inspection through glass door 12 reveals that one or more housings 31 are empty, or simply if no product appears in one or more outlet openings 20, 20'.

It is clearly apparent from this description that the invention achieves the stated goals, i.e., a dispenser that is economical to produce, maintenance-free, versatile, modular, and very simple to use.

The present invention is not limited to the exemplary embodiments described, but extends to any modification and variation obvious to a person skilled in the art while still remaining within the scope of protection defined in the attached claims.

The invention claimed is:

1. A dispenser (10, 10', 110) for retaining and dispensing consumable products, the dispenser comprises:

a thermally insulated case (11) having front side, a rear wall, lateral side walls and a door (12) which is pivotally attached to the front side of the case (11) to allow access to an interior of the case (11), at least one housing (31) having lateral walls is accommodated within the interior of the case (11) and receives the consumable products such that the consumable products are longitudinally aligned in a stacked position vertically one on top of another, the front side of the case (11) has at least one outlet opening (20) located adjacent a bottom end of the housing (31) and a lower most consumable product in the stack, the bottom end of the housing (31) has a planar rear panel (40) that slopes toward the front side of the case (11) such that a subsequent lower most consumable product directly contacts the rear panel (40) and is automatically longitudinally displaced from the stacked position, due to a configuration and structure of the housing (31), toward the outlet opening (20) and into a dispensing position when the lowermost consumable product in the stack is removed from the dispensing position and withdrawn from the housing (31), the outlet opening (20) is closed by a flexible membrane with slots which allows a front end of the lower most consumable products to partially protrude through the flexible membrane when the lower most consumable products are automatically longitudinally displaced toward the outlet opening (20), via only the planar rear panel (40) sloping toward the outlet opening (20), thus allowing the lower most consumable products, when in the dispensing position, to partially protrude through the flexible membrane to facilitate being manually withdrawn from the interior of the case (11), prior to initiation of being manually withdrawn from the case, when the lower most consumable products are in the dispensing position, the flexible membrane forms an air tight seal around an entire circumference of the front end of the lower most consumable products while enabling the front end of the lowermost consumable product to partially protrude through the flexible membrane and the outlet opening and substantially prevent airflow between the interior and an exterior of the case (11).

2. The dispenser according to claim 1, wherein the outlet opening (20') is angled in a direction opposite from the rear panel (40, 40').

3. The dispenser according to claim 1, wherein the outlet opening (20, 20") is located at a lower extremity of the housing (31) and the products in the stack are displaced automatically by gravity.

4. The dispenser according to claim 1, wherein the dispenser comprises an integrated refrigeration means (60).

5. The dispenser according to claim 1, wherein the dispenser is connected to a remote refrigeration means (60').

6. The dispenser according to claim 1, wherein the case (11) receives at least one detachable module (90, 91) comprising at least the housing (31) and the outlet opening (20, 20') is adapted for at least one product (1, 3, 5) and the dispenser comprises several interchangeable modules (90, 91).

7. The dispenser according to claim 1, wherein the dispenser comprises a plurality of generally parallel housings (31).

8. The dispenser according to claim 7, wherein the plurality of housings (31) are at least partially formed as grills (34) and are separated from one another.

9. The dispenser according to claim 1, wherein the rear panel (40) is planar and connected to the housing (31).

10. The dispenser according to claim 9, wherein the housing (31) comprises a fixed portion (32, 32'), defining a base of the housing (31), and an adjustable portion (33, 33'), defining at least one of lateral walls and a rear wall of the housing (31) and the adjustable portion (33, 33') and the fixed portion (32, 32') are coupled by an indexing means (50) to adjust a depth of the housing (31) to different product lengths.

11. The dispenser according to claim 10, wherein the indexing means (50) comprises complementary attaching shapes located respectively on the fixed portion (32, 32') and the adjustable portion (33, 33') of the housing (31) to define fixed adjustment positions.

12. The dispenser according to claim 1, wherein the blocking membrane (21, 21') is made of material which has one of a natural and a synthetic rubber base.

13. The dispenser according to claim 1, wherein at least two of the dispensers (10, 10', 110) are assembled to form a cabinet (100)for consumable products.

14. The dispenser according to claim 13, wherein the cabinet (100) comprises a centralized refrigeration means (60') and a means for connecting the refrigeration means (60') to the at least two dispensers (10, 10', 110) and the blocking membrane (21, 21') forming an air tight seal around a circumference of the leading end of the lower most product in the stack between an interior and an exterior of the cabinet.

15. The cabinet dispenser according to claim 13, wherein the at least two dispensers (10, 10', 110) are detachably connected by an assembly means (70).

16. The dispenser according to claim 15, wherein the assembly means (70) comprises complementary attachment elements (71, 72) that are at least partially integrated in and located on exterior surfaces of the at least two dispensers (10, 10', 110), the attachment elements (71) of a first of the at least two dispensers (10, 10', 110) being ribs and the attachment elements (72) of a second of the at least two dispensers (10, 10', 110) being grooves.

* * * * *